United States Patent
Nakadai

(10) Patent No.: US 8,448,025 B2
(45) Date of Patent: May 21, 2013

(54) FAULT ANALYSIS APPARATUS, FAULT ANALYSIS METHOD, AND RECORDING MEDIUM

(75) Inventor: Shinji Nakadai, Tokyo (JP)

(73) Assignee: NEC Corporation, Tokyo (JP)

( * ) Notice: Subject to any disclaimer, the term of this patent is extended or adjusted under 35 U.S.C. 154(b) by 337 days.

(21) Appl. No.: 12/735,863

(22) PCT Filed: Feb. 20, 2009

(86) PCT No.: PCT/JP2009/053017
§ 371 (c)(1),
(2), (4) Date: Aug. 20, 2010

(87) PCT Pub. No.: WO2009/110329
PCT Pub. Date: Sep. 11, 2009

(65) Prior Publication Data
US 2010/0325489 A1  Dec. 23, 2010

(30) Foreign Application Priority Data
Mar. 7, 2008  (JP) .................................. 2008-058441

(51) Int. Cl.
*G06F 11/30* (2006.01)

(52) U.S. Cl.
USPC ........... 714/26; 714/47.1; 714/47.2; 714/47.3

(58) Field of Classification Search
USPC ................................. 714/47.1, 47.2, 47.3, 26
See application file for complete search history.

(56) References Cited

U.S. PATENT DOCUMENTS 5,253,184 A * 10/1993 Kleinschnitz ................. 702/184
6,600,821 B1 * 7/2003 Chan et al. ................ 379/265.07
(Continued)

FOREIGN PATENT DOCUMENTS

JP         5-225152        9/1993
JP         6-325016        11/1994
(Continued)

OTHER PUBLICATIONS

Miyamoto, et al., "Network Traffic Anomaly Detection Using SVM", B vol. J87-B, No. 4 pp. 593-598, Apr. 11, 2004.
(Continued)

*Primary Examiner* — Chae Ko
(74) *Attorney, Agent, or Firm* — McGinn IP Law Group, PLLC

(57) ABSTRACT

The present invention determines the type of each piece of system information including a plurality of index values indicative of abnormality levels of a monitoring target device, as follows. The system information and identification information for the system information are sequentially received from the monitoring target device configured to sequentially output the system information together with the identification information for the system information. The piece of the received system information is compared with a predetermined determination criterion and thus determined to be of a particular type based on a result of the comparison. The determined type is output in association with the identification information. Input information indicative of a true type is accepted and stored in association with the identification information. The determination criterion is updated based on the piece of the system information and the information indicative of the true type. In the type determination procedure, an index value irrelevant to the abnormality level of the monitoring target device is included in the piece of the system information for comparison with the determination criterion.

2 Claims, 16 Drawing Sheets

U.S. PATENT DOCUMENTS

| | | | |
|---|---|---|---|
| 7,051,044 B1 * | 5/2006 | Fera et al. | 1/1 |
| 7,415,382 B1 * | 8/2008 | Bickford et al. | 702/178 |
| 7,624,174 B2 | 11/2009 | Sanghvi | |
| 7,844,439 B2 * | 11/2010 | Nasle et al. | 703/18 |
| 7,970,584 B2 | 6/2011 | Kikuchi et al. | |
| 2005/0125710 A1 | 6/2005 | Sanghvi | |
| 2006/0212194 A1 * | 9/2006 | Breed | 701/29 |
| 2006/0215525 A1 | 9/2006 | Oyama et al. | |
| 2006/0242288 A1 * | 10/2006 | Masurkar | 709/223 |
| 2007/0071209 A1 | 3/2007 | Horvitz et al. | |
| 2007/0150954 A1 | 6/2007 | Shon | |
| 2007/0239629 A1 * | 10/2007 | Ling | 706/12 |
| 2008/0022159 A1 | 1/2008 | Kato et al. | |
| 2008/0097628 A1 * | 4/2008 | Weatherhead et al. | 700/54 |
| 2008/0097945 A1 * | 4/2008 | Greis et al. | 706/21 |
| 2009/0048807 A1 | 2/2009 | Kikuchi et al. | |
| 2010/0153785 A1 * | 6/2010 | Keromytis et al. | 714/38 |
| 2010/0169030 A1 * | 7/2010 | Parlos | 702/58 |
| 2010/0306574 A1 * | 12/2010 | Suzuki et al. | 714/4 |
| 2011/0029817 A1 * | 2/2011 | Nakagawa et al. | 714/37 |
| 2011/0238258 A1 * | 9/2011 | Singh et al. | 701/33 |

FOREIGN PATENT DOCUMENTS

| | | |
|---|---|---|
| JP | 8-101258 | 4/1996 |
| JP | 11-355276 | 12/1999 |
| JP | 2000-222255 | 8/2000 |
| JP | 2001-142746 | 5/2001 |
| JP | 2003-263342 | 9/2003 |
| JP | 2004-110602 | 4/2004 |
| JP | 3581934 | 8/2004 |
| JP | 2004-348740 A | 12/2004 |
| JP | 2005-85157 | 3/2005 |
| JP | 2005-115912 | 4/2005 |
| JP | 3674707 | 5/2005 |
| JP | 2006-59266 | 3/2006 |
| JP | 2006-268610 | 10/2006 |
| JP | 2007-172131 | 7/2007 |
| JP | 2007-179542 | 7/2007 |
| JP | 2008-27061 | 2/2008 |
| WO | WO 2007/052327 A1 | 5/2007 |

OTHER PUBLICATIONS

Jing Wu, Jian-Guo Zhou, Pu-Liuyan, Ming Wu, "A Study on Net Work Fault Knowledge Acquisition Based on Supportvector Machine", Proceedings of the Fourth International Conference on Machine Learning and Cybernetics, Guangzhou, Aug. 18-21, 2005.

"Hideki Aso, Hiroharu Tsuda, and Noboru Murata "Statistics for Pattern Recognition and Learning", Iwanami Shoten, Publishers, pp. 107-123, 2005".

Japanese Office Action dated Oct. 11, 2012 with English translation.

* cited by examiner

Fig.3

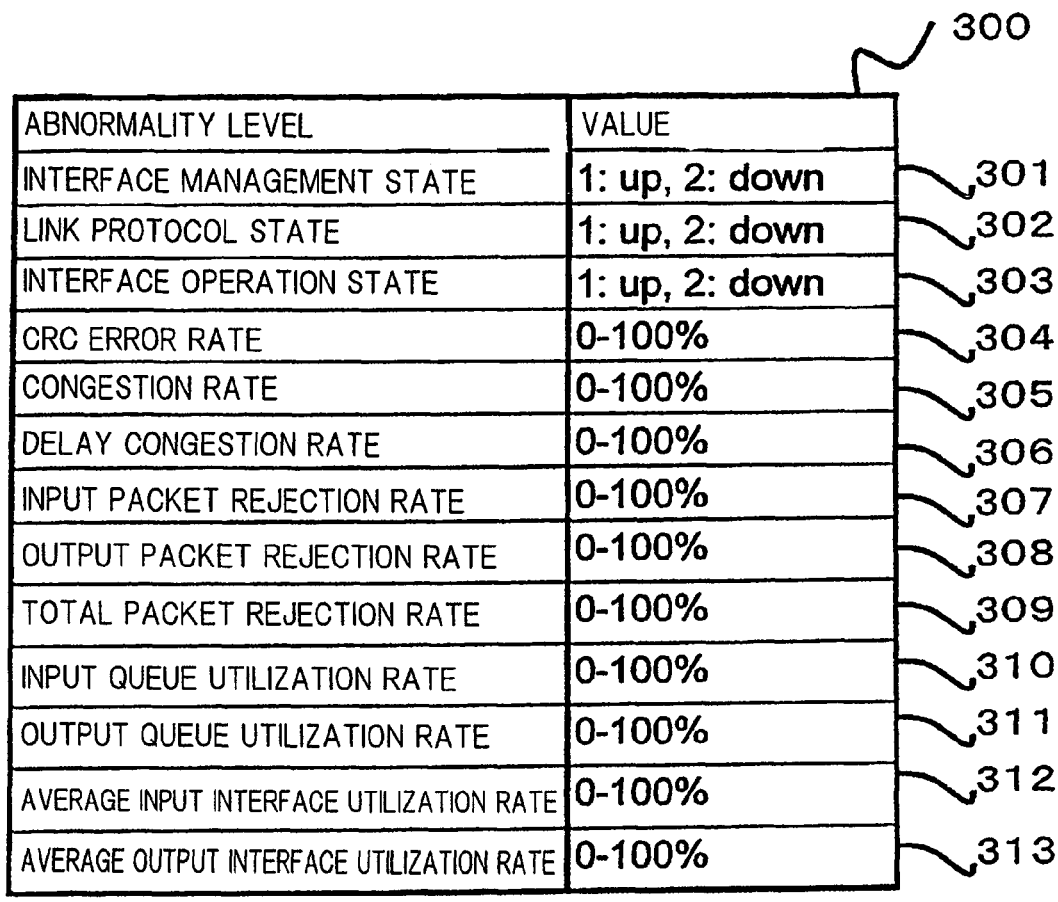

| ABNORMALITY LEVEL | VALUE | |
|---|---|---|
| INTERFACE MANAGEMENT STATE | 1: up, 2: down | 301 |
| LINK PROTOCOL STATE | 1: up, 2: down | 302 |
| INTERFACE OPERATION STATE | 1: up, 2: down | 303 |
| CRC ERROR RATE | 0-100% | 304 |
| CONGESTION RATE | 0-100% | 305 |
| DELAY CONGESTION RATE | 0-100% | 306 |
| INPUT PACKET REJECTION RATE | 0-100% | 307 |
| OUTPUT PACKET REJECTION RATE | 0-100% | 308 |
| TOTAL PACKET REJECTION RATE | 0-100% | 309 |
| INPUT QUEUE UTILIZATION RATE | 0-100% | 310 |
| OUTPUT QUEUE UTILIZATION RATE | 0-100% | 311 |
| AVERAGE INPUT INTERFACE UTILIZATION RATE | 0-100% | 312 |
| AVERAGE OUTPUT INTERFACE UTILIZATION RATE | 0-100% | 313 |

Fig.6

| FEATURE | TIME | LOCATION | VALUE | |
|---|---|---|---|---|
| CALL LOSS RATE OF COMMUNICATION A | 08/01/11 08:15:00 | MONITORING TARGET DEVICE 431 | 1 | 2001 |
| CPU UTILIZATION RATE | 08/01/11 08:15:00 | MONITORING TARGET DEVICE 431 | 60 | 2002 |
| TRIAL COUNT OF COMMUNICATION A | 08/01/11 08:15:00 | MONITORING TARGET DEVICE 431 | 15 | 2003 |
| ESTIMATED VALUE OF CALL LOSS RATE OF COMMUNICATION A BASED ON PAST DATA | 08/01/11 08:15:00 | MONITORING TARGET DEVICE 431 | 0 | 2004 |
| ESTIMATED VALUE OF CALL LOSS RATE OF COMMUNICATION A BASED ON CURRENT VALUES FOR ADJACENT DEVICES | 08/01/11 08:15:00 | MONITORING TARGET DEVICE 431 | 0 | 2005 |
| ESTIMATED VALUE OF CPU UTILIZATION RATE BASED ON PAST DATA | 08/01/11 08:15:00 | MONITORING TARGET DEVICE 431 | 50 | 2006 |
| ESTIMATED VALUE OF CPU UTILIZATION RATE BASED ON CURRENT VALUES FOR ADJACENT DEVICES | 08/01/11 08:15:00 | MONITORING TARGET DEVICE 431 | 42 | 2007 |
| CALL LOSS RATE OF COMMUNICATION A | 08/01/11 08:15:00 | MONITORING TARGET DEVICE 432 | 3 | 2008 |
| CPU UTILIZATION RATE | 08/01/11 08:15:00 | MONITORING TARGET DEVICE 432 | 70 | 2009 |
| TRIAL COUNT OF COMMUNICATION A | 08/01/11 08:15:00 | MONITORING TARGET DEVICE 432 | 20 | 2010 |
| ESTIMATED VALUE OF CALL LOSS RATE OF COMMUNICATION A BASED ON PAST DATA | 08/01/11 08:15:00 | MONITORING TARGET DEVICE 432 | 8 | 2011 |
| ESTIMATED VALUE OF CALL LOSS RATE OF COMMUNICATION A BASED ON CURRENT VALUES FOR ADJACENT DEVICES | 08/01/11 08:15:00 | MONITORING TARGET DEVICE 432 | 1 | 2012 |
| ESTIMATED VALUE OF CPU UTILIZATION RATE BASED ON PAST DATA | 08/01/11 08:15:00 | MONITORING TARGET DEVICE 432 | 60 | 2013 |
| ESTIMATED VALUE OF CPU UTILIZATION RATE BASED ON CURRENT VALUES FOR ADJACENT DEVICES | 08/01/11 08:15:00 | MONITORING TARGET DEVICE 432 | 50 | 2014 |
| ... | | | | 2015 |
| CALL LOSS RATE OF COMMUNICATION A | 08/01/11 08:30:00 | MONITORING TARGET DEVICE 431 | 2 | 2016 |
| CPU UTILIZATION RATE | 08/01/11 08:30:00 | MONITORING TARGET DEVICE 431 | 65 | 2017 |
| TRIAL COUNT OF COMMUNICATION A | 08/01/11 08:30:00 | MONITORING TARGET DEVICE 431 | 25 | 2018 |
| ESTIMATED VALUE OF CALL LOSS RATE OF COMMUNICATION A BASED ON PAST DATA | 08/01/11 08:30:00 | MONITORING TARGET DEVICE 431 | 1 | 2019 |
| ESTIMATED VALUE OF CALL LOSS RATE OF COMMUNICATION A BASED ON CURRENT VALUES FOR ADJACENT DEVICES | 08/01/11 08:30:00 | MONITORING TARGET DEVICE 431 | 1 | 2020 |
| ESTIMATED VALUE OF CPU UTILIZATION RATE BASED ON PAST DATA | 08/01/11 08:30:00 | MONITORING TARGET DEVICE 431 | 55 | 2021 |
| ESTIMATED VALUE OF CPU UTILIZATION RATE BASED ON CURRENT VALUES FOR ADJACENT DEVICES | 08/01/11 08:30:00 | MONITORING TARGET DEVICE 431 | 45 | 2022 |

| FEATURE NUMBER | FEATURE |
|---|---|
| 1 | CALL LOSS RATE OF COMMUNICATION A |
| 2 | CPU UTILIZATION RATE |
| 3 | TIME |
| 4 | DAY OF THE WEEK |
| 5 | TRIAL COUNT OF COMMUNICATION A |
| 6 | ESTIMATED VALUE OF CALL LOSS RATE OF COMMUNICATION A BASED ON PAST DATA |
| 7 | ESTIMATED VALUE OF CALL LOSS RATE OF COMMUNICATION A BASED ON CURRENT VALUES FOR ADJACENT DEVICES |
| 8 | ESTIMATED VALUE OF CPU UTILIZATION RATE BASED ON PAST DATA |
| 9 | ESTIMATED VALUE OF CPU UTILIZATION RATE BASED ON CURRENT VALUES FOR ADJACENT DEVICES |

1901
1902
1903
1904
1905
1906
1907
1908
1909

ABNORMALITY LEVEL
SYSTEM INFORMATION

Fig.14
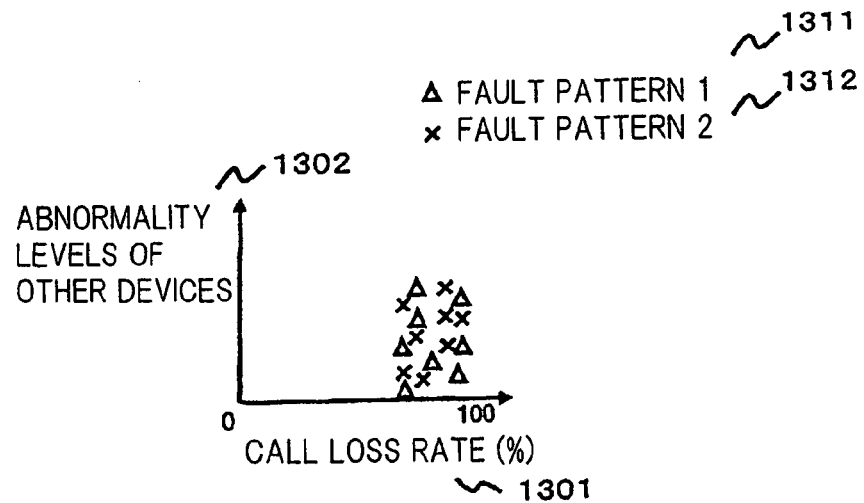
Fig.15
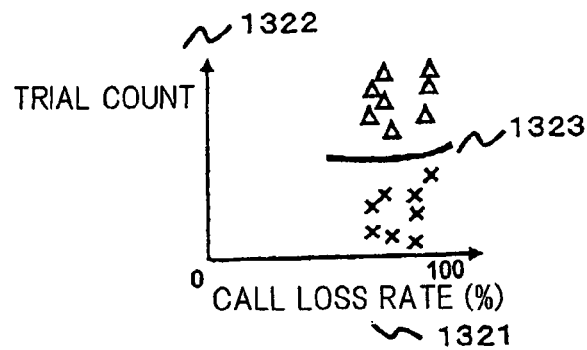
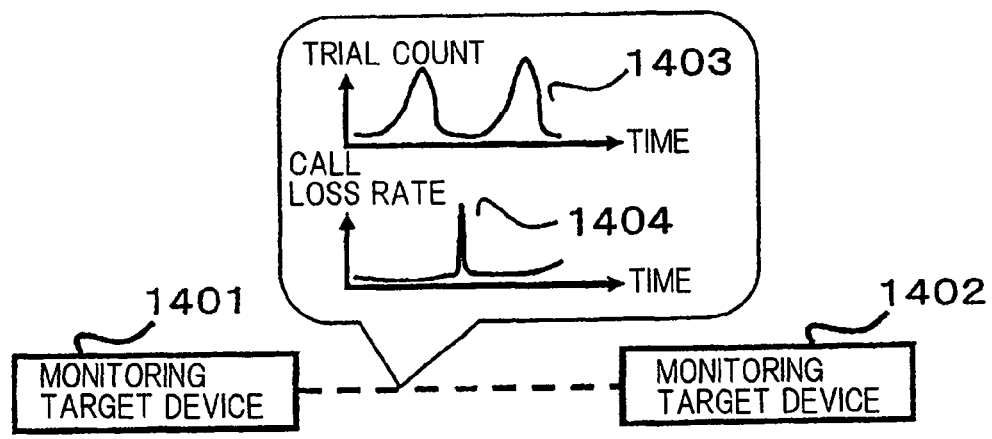

Fig.16
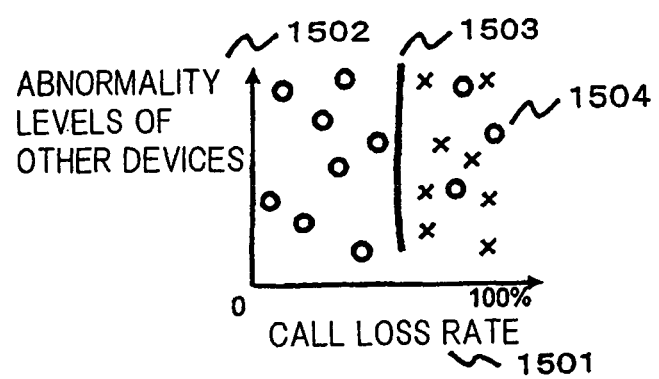
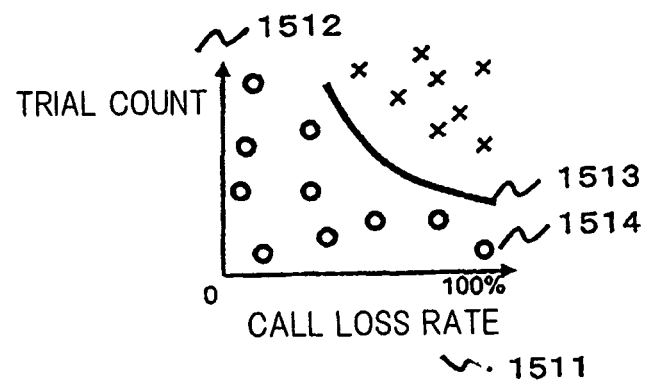

FAULT ANALYSIS APPARATUS, FAULT ANALYSIS METHOD, AND RECORDING MEDIUM

TECHNICAL FIELD

The present invention relates to a fault analysis apparatus, a fault analysis method, and a recording medium, and in particular, to a fault analysis apparatus, a fault analysis method, and a recording medium in which system faults can be detected and classified without the need to set a rule or a threshold.

BACKGROUND ART

FIG. 1 is a diagram showing an example of a fault analysis apparatus disclosed in Japanese Patent No. 3581934.

As shown in FIG. 1, fault analysis apparatus 100 includes abnormal-call amount monitoring section 101 such as an operation measurement, recording (OM) and transfer member or a fault recording and transfer member, threshold determination section 115, and determination result display section 116.

Fault analysis apparatus 100 configured as described above operates as follows.

Abnormal-call amount monitoring section 101 monitors monitoring target devices 131 and 132 to determine whether or not any log indicating occurrence of abnormality has been transmitted by monitoring target device 131 or 132. If there is such a log, abnormal-call amount monitoring section 101 counts a call amount that is a traffic amount per certain time depending on the type of abnormality. When the call amount within a given time is equal to or larger than a predetermined threshold, threshold determination section 115 notifies a maintenance operator of the abnormality as a fault through determination result display section 116.

Owing to such an operation, fault analysis apparatus 100 can automatically detect faults.

FIG. 2 is a diagram showing another example of a fault analysis apparatus disclosed in the document "JING WU, JIAN-GUO ZHOU, PU-LIUYAN, MING WU, "A STUDY ON NET WORK FAULT KNOWLEDGE ACQUISITION BASED ON SUPPORTVECTOR MACHINE", Proceedings of the Fourth International Conference on Machine Learning and Cybernetics, Guangzhou, 18-21 Aug. 2005".

As shown in FIG. 2, fault analysis apparatus 200 includes abnormality level monitoring section 201, abnormality level storage section 210, fault case registration section 211, case storage section 212, pattern learning section 213, knowledge storage section 214, pattern determination section 215, determination result display section 216, and determination correction input section 217 in order to manage monitoring target system 230 including monitoring target devices 231 to 234.

Fault analysis apparatus 200 configured as described above collects an abnormality level that is an index for the possibility of a failure in the apparatus or a line based on the results of monitoring of monitoring target devices 231 to 234.

FIG. 3 is a diagram showing the values of abnormality levels used for fault analysis apparatus 200 shown in FIG. 2.

The abnormality levels used for fault analysis apparatus 200 shown in FIG. 2 include values indicating whether or not a relevant link is inactive, an error rate, a congestion rate, a rejection rate, and a utilization rate as shown in FIG. 3.

Based on a combination of the abnormality levels obtained, pattern determination section 215 uses knowledge information stored in knowledge storage section 214 to determine whether or not a fault has occurred in monitoring target system 230. Pattern determination section 215 then presents the result of the determination to a maintenance operator through determination result display section 216.

The knowledge information stored in knowledge storage section 214 is generated in accordance with the following procedure.

First, the maintenance operator uses fault case registration section 211 to register past fault cases in case storage section 212.

Pattern learning section 213 generates knowledge information from fault cases stored in case storage section 212 and combinations of abnormality levels stored in abnormality level storage section 210 and stores the knowledge information in knowledge storage section 214. Here, the fault case is information indicating the time of occurrence of a fault and the type of the fault. Pattern learning means 213 generates knowledge information by pattern learning carried out using a pattern identification device called Support Vector Machine (SVM).

The SVM is described in "Hideki Aso, Hiroharu Tsuda, and Noboru Murata "Statistics for Pattern Recognition and Learning", Iwanami Shoten, Publishers, pp. 107-123, 2005" in detail. In general, in pattern learning, first, a one-dimensional class (pattern) is estimated from a multidimensional variable. A variable used as the multidimensional variable is called a feature. Furthermore, a d-dimensional space formed by (d) features is called feature space Rd. Additionally, when an input variable is feature variable (x) ($\in$Rd) in the feature space and an output variable is a class (y) ($\in\{1,-1\}$), (y) changes when (x) passes a certain area in the feature space. A boundary at which the change occurs is called a hyperplane.

The hyperplane can be generated by pattern learning when output values yi is provided for (n) input values xi (i=1, 2, . . . , n). In pattern learning, the distance between input values resulting in different output values (y) is called a margin.

Knowledge information obtained by pattern learning means 213 is a threshold required to detect and classify the fault or is, in a feature space with a combination of abnormality levels, a hyperplane required to classify the fault as one of a plurality of classes.

If the fault determination result presented to the maintenance operator by determination result display section 216 indicates that the apparent fault is, in practice, not a fault, determination correction input section 217 is used to input corresponding information to case storage section 212.

Owing to such an operation, unlike fault analysis apparatus 100 shown in FIG. 1, fault analysis apparatus 200 shown in FIG. 2 can detect faults without the need to set a threshold for fault detection and classification.

However, disadvantageously, the above-described fault analysis apparatuses cannot detect or classify or cannot accurately detect such a fault as may produce an adverse effect not indicated by a variable indicating the abnormality level but by a variable other than the one indicating the abnormality level, for example, a variable for the number of data transmissions during a predetermined period of inter-apparatus communication, even if the maintenance operator registers relevant fault cases.

DISCLOSURE OF THE INVENTION

The present invention has been developed in view of the above-described problems. An object of the present invention is to provide a fault analysis apparatus, a fault analysis method, and a recording medium in which such a fault as may produce an adverse effect not indicated by a variable indicating the abnormality level but by a variable other than the one indicating the abnormality level can be detected or classified.

To accomplish this object, the present invention provides a fault analysis apparatus including:

system information reception means for sequentially receiving system information including a plurality of index values indicative of abnormality levels of a monitoring target device and identification information for the system information, from the monitoring target device configured to sequentially output the system information together with the identification information for the system information;

type determination means for comparing each piece of the system information received by the system information reception means with a predetermined determination criterion to determine each piece of the system information to be of a particular type based on a result of the comparison;

a determination result output section configured to output the identification information for each piece of the system information and the type determined for each piece of the system information, in association with each other;

fault case registration means for accepting input information indicative of the true type of the identification information for each piece of the system information;

a case storage section for storing the identification information for each piece of the system information in association with the true type; and pattern learning means for updating the determination criterion based on each piece of the system information received by the system information reception means and the true type stored in association with the identification information for each piece of the system information, wherein the type determination means determines each piece of the system information to be of a particular type by including an index value irrelevant to the abnormality level of the monitoring target device, in each piece of the system information for comparison with the determination criterion.

Furthermore, the present invention provides a fault analysis method using an information processing apparatus, the method including:

a step in which the information processing apparatus sequentially receives system information including a plurality of index values indicative of abnormality levels of a monitoring target device and identification information for the system information, from the monitoring target device configured to sequentially output the system information together with the identification information for the system information;

a step in which the information processing apparatus compares each piece of the received system information with a predetermined determination criterion to determine each piece of the system information to be of a particular type based on a result of the comparison;

a step in which the information processing apparatus outputs the identification information for each piece of the system information and each type determined for each piece of the system information, in association with each other;

a step in which the information processing apparatus accepts input information indicative of the true type of the identification information for each piece of the system information;

a step in which the information processing apparatus stores the identification information for each piece of the system information in association with the true type;

a step in which the information processing apparatus updates the determination criterion based on each piece of the received system information and the true type stored in association with the identification information for each piece of the system information; and a step in which the information processing apparatus determines each piece of the system information to be of a particular type by including an index value irrelevant to the abnormality level of the monitoring target device, in each piece of the system information for the comparison with the determination criterion.

Furthermore, the present information provides a recording medium into which is written a program for causing a computer to operate the program causing the computer to execute:

a procedure in which the computer sequentially receives system information including a plurality of index values indicative of abnormality levels of a monitoring target device and identification information for the system information, from the monitoring target device configured to sequentially output the system information together with the identification information for the system information;

a procedure in which the computer compares the piece of the received system information with a predetermined determination criterion to determine each piece of the system information to be of a particular type based on a result of the comparison;

a procedure in which the computer outputs the identification information for each piece of the system information and each type determined for each piece of the system information, in association with each other;

a procedure in which the computer accepts input information indicative of the true type of the identification information for each piece of the system information;

a procedure in which the computer stores the identification information for each piece of the system information in association with the true type;

a procedure in which the computer updates the determination criterion based on each piece of the received system information and the true type stored in association with the identification information for each piece of the system information; and a procedure in which the computer determines each piece of the system information to be of a particular type by including an index value irrelevant to the abnormality level of the monitoring target device, in each piece of the system information for comparison with the determination criterion.

The present invention allows detection and classification of such a fault as may produce an adverse effect not indicated by a variable indicating the abnormality level but by a variable other than the one indicating the abnormality level.

BRIEF DESCRIPTION OF THE DRAWINGS

FIG. 3 is a diagram showing the values of abnormality levels used for the fault analysis apparatus shown in FIG. 2;

FIG. 6 is a diagram showing a table stored in a status storage section shown in FIG. 4;

FIG. 7 is a diagram showing a data structure stored in a pattern learning section shown in FIG. 4;

FIG. 14 is a diagram showing a feature space illustrating another exemplary embodiment of operation of the fault analysis apparatus shown in FIG. 4;

FIG. 15 is a diagram of the configuration of a monitoring target illustrating another exemplary embodiment of operation of the fault analysis apparatus shown in FIG. 4;

FIG. 16 is a diagram showing a feature space illustrating another exemplary embodiment of operation of the fault analysis apparatus shown in FIG. 4;

BEST MODE FOR CARRYING OUT THE INVENTION

Exemplary embodiments will be described below with reference to the drawings.

Figure 1:
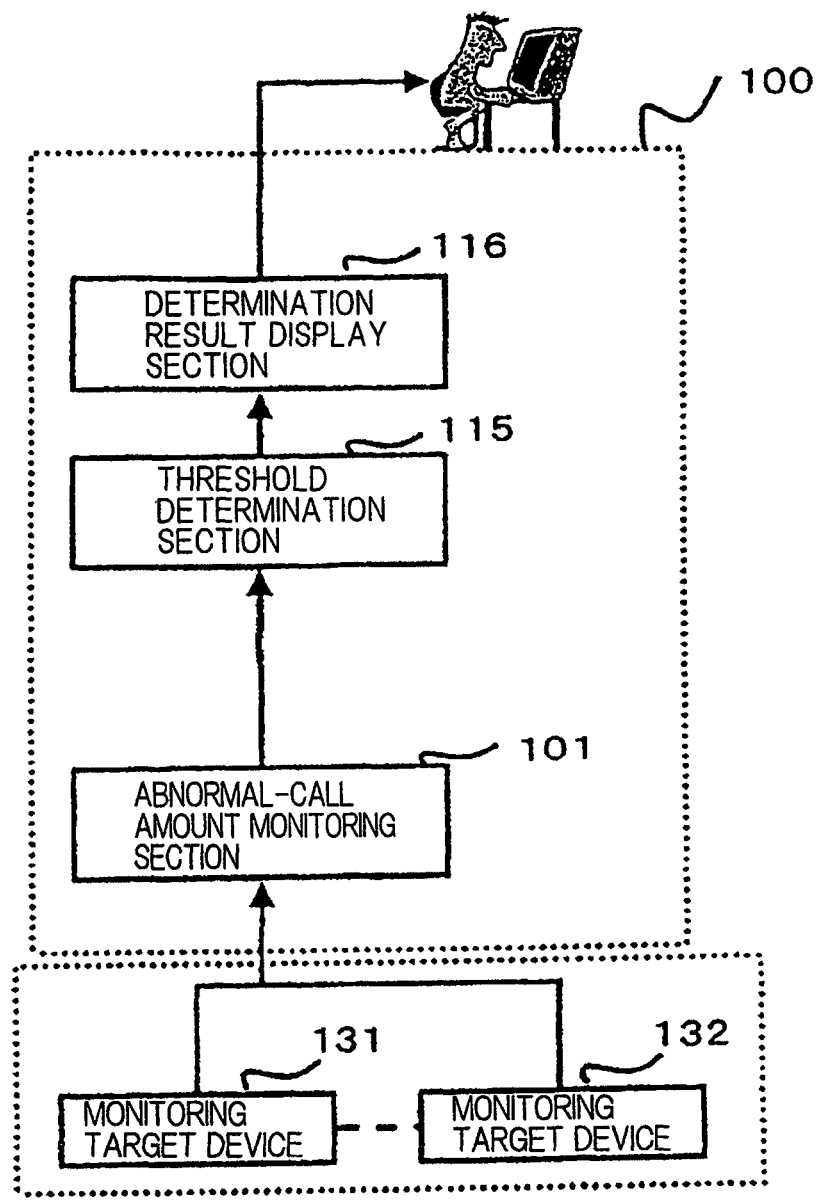
FIG. 1 is a diagram showing an example of a fault analysis apparatus.
Figure 2:
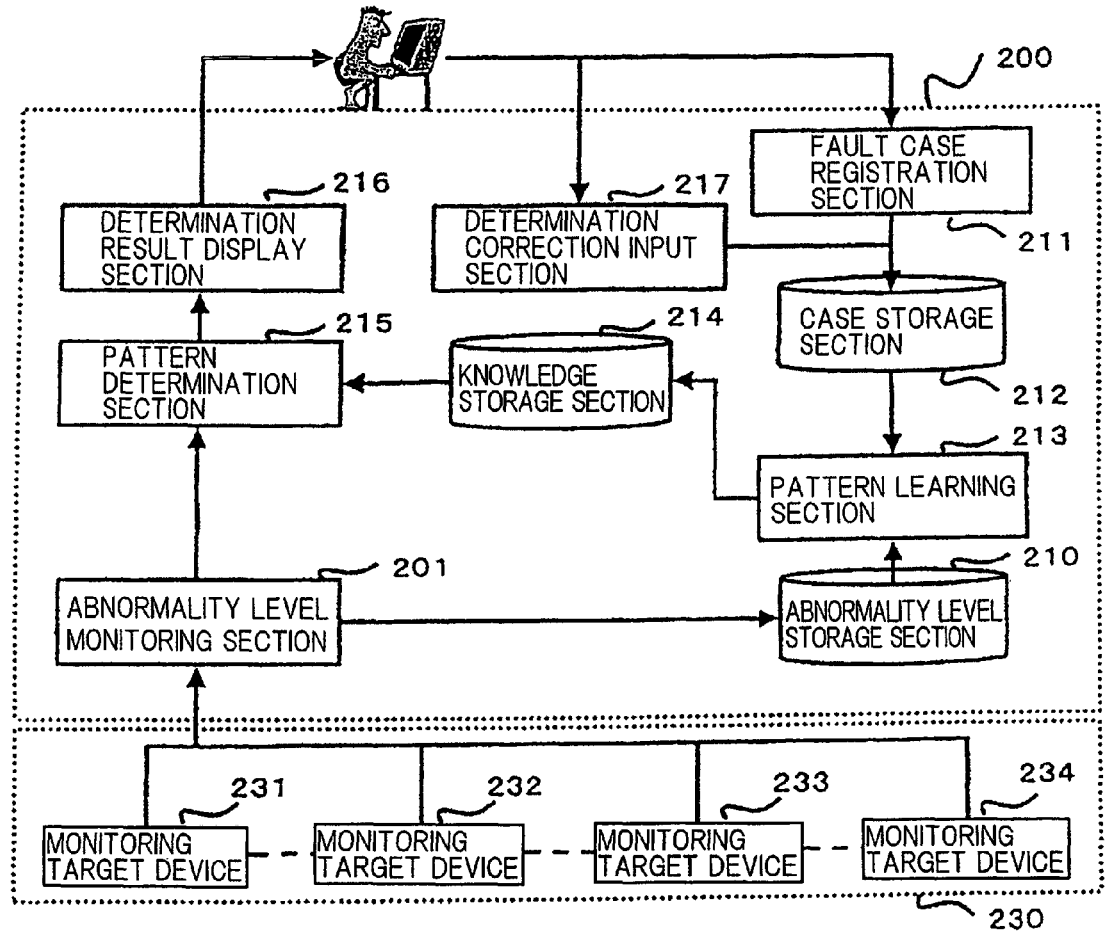
FIG. 2 is a diagram showing another example of the fault analysis apparatus.
Figure 4:
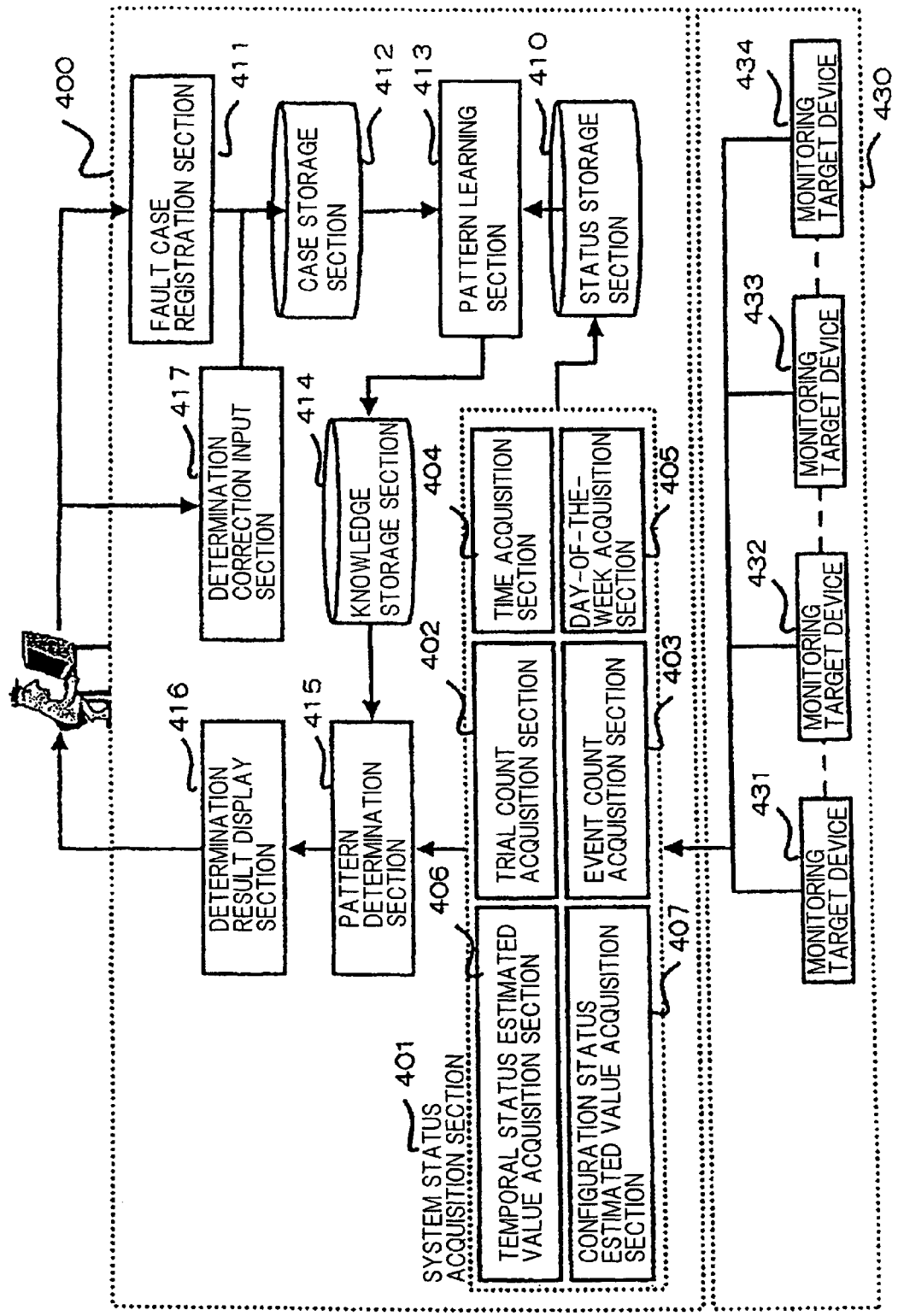
FIG. 4 is a block diagram showing an exemplary embodiment of the fault analysis apparatus.

FIG. 4 is a block diagram showing an exemplary embodiment of a fault analysis apparatus.

As shown in FIG. 4, the exemplary embodiment is computer (including at least a central processing device, a processor, and a data processing device) 400 that is an information processing apparatus connected to system 430 with monitoring target devices 431 to 434 so as to be able to communicate with system 430 and operating under program control.

Computer 400 includes fault case registration section 411, case storage section 412, system status acquisition section 401 that is system information reception means, status storage section 410, pattern learning section 413, knowledge storage section 414, pattern determination section 415 that is type determination means, determination result display section 416 that is determination result output means, and determination correction input section 417.

Fault case registration section 411 is connected to case storage section 412. Case storage section 412 is connected to each of fault case registration section 411 and pattern learning section 413. Pattern learning section 413 is connected to each of status storage section 410 and knowledge storage section 414. Status storage section 410 is connected to each of pattern learning section 413 and system status acquisition section 401. Knowledge storage section 414 is connected to each of pattern learning section 413 and pattern determination section 415. System status acquisition section 401 is connected to each of status storage section 410 and pattern determination section 414. Pattern determination section 415 is connected to each of knowledge storage section 414, system status acquisition section 401, and determination result display section 416. Determination result display section 416 is connected to pattern determination section 415.

In the exemplary embodiment, knowledge information, a threshold, a boundary surface, and a hyperplane refer to the same element and correspond to a determination criterion according to the present invention. Furthermore, a feature according to the exemplary embodiment corresponds to an index value according to the present invention.

The above-described components generally operate as follows.

Fault case registration section 411 accepts a fault occurrence time and a fault occurrence location input by a terminal (not shown in the drawings) used by a maintenance operator that is an operator according to the present invention. A set of the fault occurrence time and the fault occurrence location is hereinafter referred to as a case. The case is information in which the fault occurrence time and the fault occurrence location above described or the time and location determined to be normal are associated with each other. Here, the time and location stored as a case may be a longer time and a larger location, that is, a period and a range, respectively. Furthermore, cases are classified into a fault case corresponding to an actual fault and a normal case corresponding to the case where a seemingly faulty location is, in practice, normal. The fault case includes the occurrence time and location of the fault. The normal case includes, a time and location determined to be normal. Additionally, the case may include the type of the case (corresponding to a class or a pattern and to a true type according to the present invention). The type of the case is information indicative of the normal state or information including the type of the fault. In this case, the fault case includes the occurrence time and location and the type of the fault. The normal case includes a time and location determined to be normal as well as information indicative of the normality. Alternatively, the type of the case may be configured to be independent of the case. In the exemplary embodiment, the case does not include the type of the case. Of course, the case may include the type of the case.

Fault case registration section 411 may accept the input type of the case together with the case. The location may be an identifier that identifies each of monitoring target devices 431 to 434 or any information such as the name of a line or an address which allows the location of occurrence of the fault to be determined. The fault occurrence time and location are included in identification information for system information (status information) according to the present invention. Furthermore, in the exemplary embodiment, the identification information for the system information corresponds to the case. The identification information for the system information may include information that enables the system information to be identified. The identification information may include a unique identifier.

Case storage section 412 receives a case from fault case registration section 411 or determination correction input section 417 described below. The received case is stored in case storage section 412.

Figure 5:
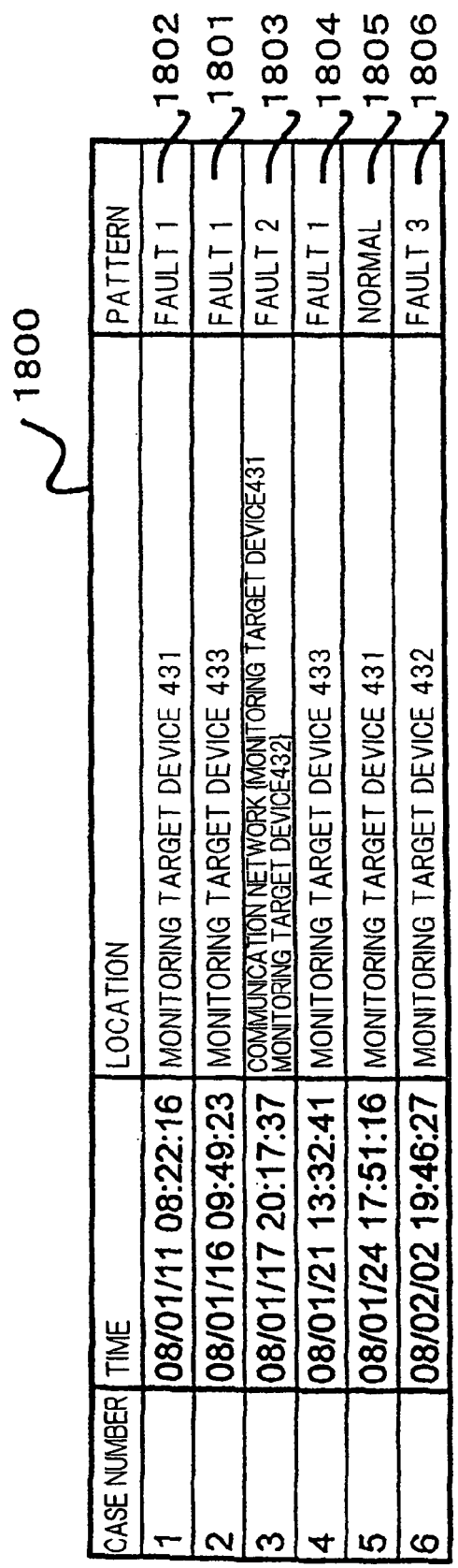
FIG. 5 is a diagram showing a table in a case storage section shown in FIG. 4.

FIG. 5 is a diagram showing a table in case storage section 412 shown in FIG. 4.

As shown in FIG. 5, case storage section 412 stores the case number, the time, the location, and the pattern in association with one another. The case number, the time, and the location are identification information for the system information. The pattern corresponds to the type of the case. Each of the case number, the time, and the location is not essential. The minimum number of pieces of information required to identify the system information is one.

System status acquisition section 401 acquires system information (status information) on any of monitoring target devices 431 to 434 in monitoring target system 430. The system information includes not only the abnormality level but also the status information on the monitoring target device. System status acquisition section 401 stores the acquired system information in status storage section 410. Unlike the abnormality level, the status information has a value the magnitude of which does not indicate the possibility of a fault. For example, the number of times that a device has transmitted data to another device during a predetermined period does not indicate the possibility of a failure even if the value is large. In the exemplary embodiment, the abnormality level corresponds to a plurality of index values indicating the abnormality level of the monitoring target device. Furthermore, the status information corresponds to an index value irrelevant to the abnormality level of the monitoring target device. Additionally, the information (hereinafter referred to as the system information) including the abnormality level and the status information corresponds to the system information according to the present invention.

System status acquisition section 401 stores the acquired system information in status storage section 410. The system information includes a feature serving as the base of a feature space used by pattern learning section 413 to carry out pattern learning.

Furthermore, system status acquisition section 401 includes trial count acquisition section 402, event count acquisition section 403, time acquisition section 404, day-of-the-week acquisition section 405, temporal status estimated value acquisition section 406, and configuration status estimated value acquisition section 407. System status acquisition section 401 passes received system information to trial count acquisition section 402, event count acquisition section 403, time acquisition section 404, day-of-the-week acquisition section 405, temporal status estimated value acquisition section 406, and configuration status estimated value acquisition section 407. Trial count acquisition section 402, event count acquisition section 403, time acquisition section 404, day-of-the-week acquisition section 405, temporal status estimated value acquisition section 406, and configuration status estimated value acquisition section 407 execute the respective processes based on the received system information, and passes output results to pattern determination section 415.

Trial count acquisition section 402 acquires transmission count information indicative of the number of times that any one of monitoring target devices 431 to 434 has transmitted data to another device connected to the monitoring target device, during a predetermined period. The transmission count information may be acquired by, for example, extracting the transmission count information included in the system information. Trial count acquisition section 402 passes the acquired transmission count information to pattern determination section 415.

Event count acquisition section 403 acquires the number of events having occurred in monitoring target devices 431 to 434 during a predetermined period. The event count is, for example, the number of times that the monitoring target device has been activated during a predetermined period. The event count may be acquired by, for example, extracting information such as the activation count included in the system information. Trial count acquisition section 402 passes the acquired event count to pattern determination section 415 indicative of the event count acquired.

Time acquisition section 404 acquires time information indicative of the time of the case or the time of execution of monitoring. The time information may be acquired by, for example, extracting the time information included in the system information or acquiring the current time measured by time acquisition section 404. Time acquisition section 404 passes the acquired time information to pattern determination section 415.

Day-of-the-week acquisition section 405 acquires the day of the week of occurrence of the case or the day of the week of execution of monitoring. The day-of-the-week information may be acquired by, for example, extracting the day-of-the-week information included in the system information or acquiring the current day of the week measured by day-of-the-week acquisition section 405. Day-of-the-week acquisition section 405 passes the acquired day-of-the-week information to pattern determination section 415.

Temporal status estimated value acquisition section 406 includes temporal status estimated value calculation means. Temporal status estimated value calculation means calculates the current predicted value for the system information on the monitoring target device based on the system information previously transmitted by each monitoring target device and stored in status storage section 410 described below. Temporal status estimated value calculation section 406 passes the calculated predicted value for the system information to pattern determination section 415.

For example, the average of the values obtained at the same time during the past several days can be used to acquire information including the status or context of the monitoring target device.

Configuration status estimated value acquisition section 407 includes configuration status estimated value calculation means. Configuration status estimated value acquisition means determines the relationship between the system information on a first monitoring target device and the system information on a second monitoring target device. Configuration status estimated value acquisition means uses the current system information on the second monitoring target device to calculate the system information on the first monitoring target device. For example, when the relationship b=2a steadily holds true between observed value (a) for monitoring target device 431 and observed value (b) for monitoring target device 432, value 2a for monitoring target device 432 estimated from value (a) for monitoring target device 431 is acquired here. The relationship b=2a is calculated from the previous system information on the first monitoring target device and the current system information on the second monitoring target device; both pieces of system information are stored in status storage section 410 described below. For example, the calculation may be based on a mathematical model (for example, an ARX model (Autoregressive model with exogenous input) that steadily holds true between the first monitoring target device and the second monitoring target device. Configuration status estimated value acquisition section 407 passes the calculated predicted value for the system information to pattern determination section 415.

Status storage section 410 stores, for example, system information previously received by system status acquisition section 491.

FIG. 6 is a diagram showing a table stored in status storage section 410 shown in FIG. 4.

As shown in FIG. 6, status storage section 401 stores a feature indicative of the abnormality level or status information included in the system information previously received by system status acquisition section 401, in association with the time, location, and values. Furthermore, for example, the storage may be carried out so as to enable system information that can be identified by the time and location to be returned.

Pattern learning section 413 reads, from status storage section 410, the system information associated with each of the cases stored in case storage section 412, periodically or at the timing when the maintenance operator inputs data to fault case registration section 411 or to determination correction input section 417. The feature contained in each piece of the read system information forms a feature space used by pattern learning means 413.

That is, the abnormality level or status information included in the system information read based on the case indicates a feature vector in the feature space.

FIG. 7 is a diagram showing a data structure stored in pattern learning section 413 shown in FIG. 4.

As shown in FIG. 7, data 1901 and 1902 on the abnormality level and data 1903 to 1909 on the system information are stored in pattern learning section 413.

Furthermore, pattern learning section 413 generates a threshold (hyperplane) required to detect and classify a fault based on the read system information, and stores the threshold in knowledge storage section 414.

The threshold generated by pattern learning section 413 is stored in knowledge storage section 414.

Pattern determination section 415 receives the system information from system status acquisition section 401. Pattern determination section 415 then reads the threshold stored in knowledge storage section 414 to determine whether the read system information indicates a fault or normality. Moreover, upon determining that the system information indicates a fault, pattern determination section 415 further determines the type of the fault. Pattern determination section 415 passes the identification information for the system information and the determination results to determination result display section 416.

Determination result display section 416 displays the determination result (corresponding to the pattern, the type of the case, or the type according to the present invention) received from pattern determination section 415 and the identification information (case) for the system information to the maintenance operator.

If the determination result (corresponding to the pattern, the type of the case, or the type according to the present invention) presented to the maintenance operator by determination result display section 416 is incorrect, determination correction input section 417 registers, in case storage section 412, the case and the type of the case (corresponding to the true type according to the present invention) determined by the maintenance operator to be correct. For example, in addition to the time and location (case), the type of the case (true type) or the like may be added to case storage section 412, or the case stored in case storage section 412 may be corrected to the one determined by the maintenance operator to be correct.

Now, the general operation of the exemplary embodiment will be described with reference to the flowcharts in FIGS. 8 to 10.

Figure 8:
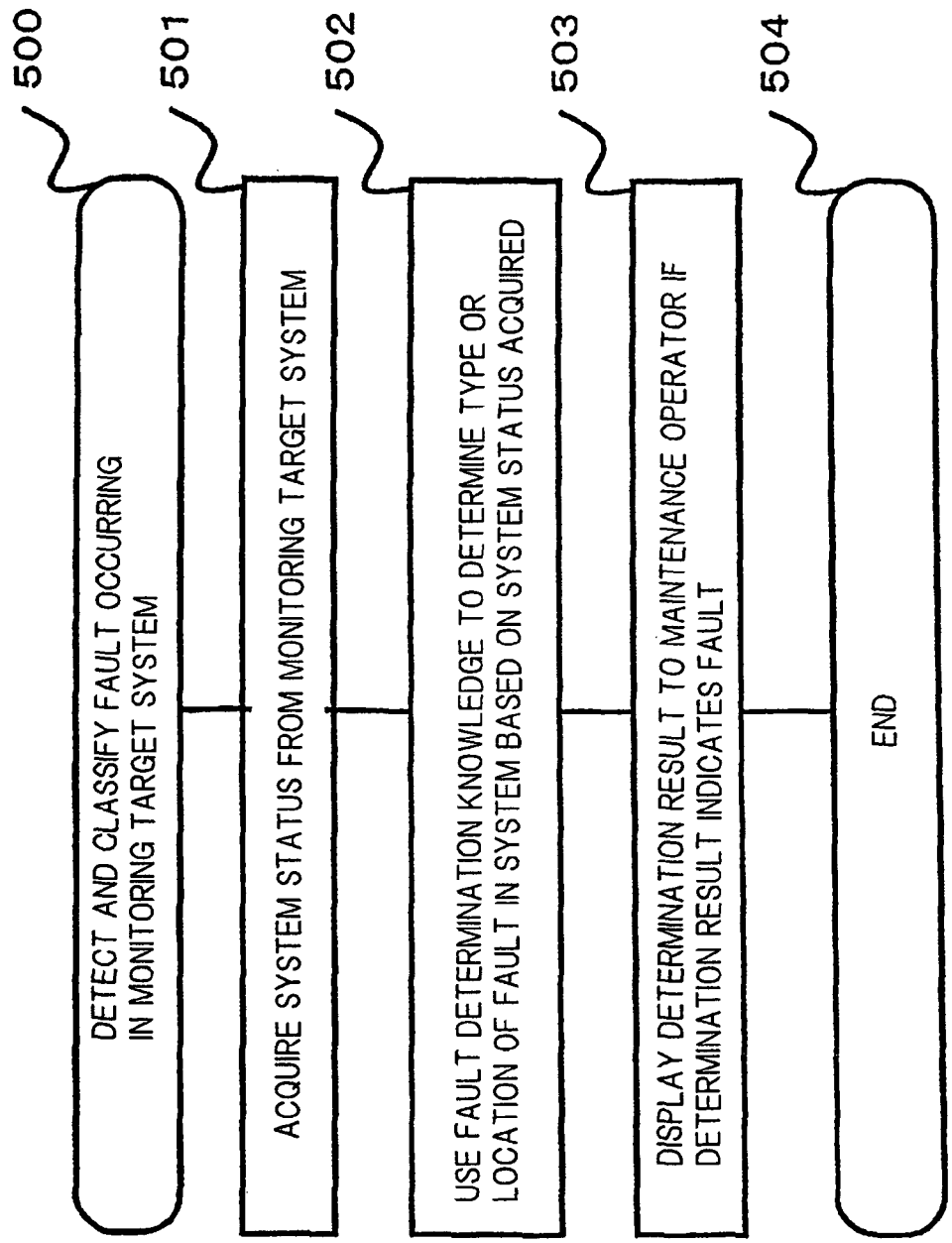
FIG. 8 is a flowchart illustrating the operation of the fault analysis apparatus shown in FIG. 4.
Figure 9:
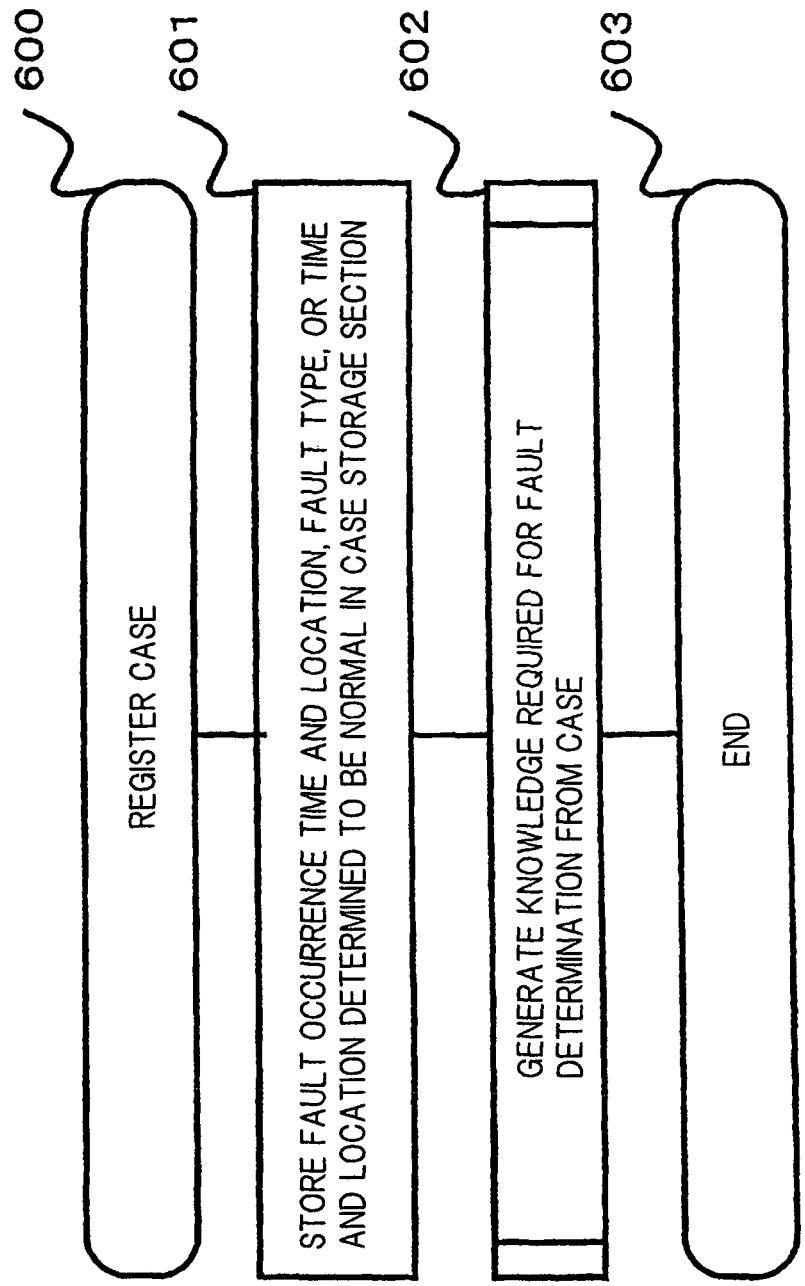
FIG. 9 is a flowchart illustrating the operation of the fault analysis apparatus shown in FIG. 4.
Figure 10:
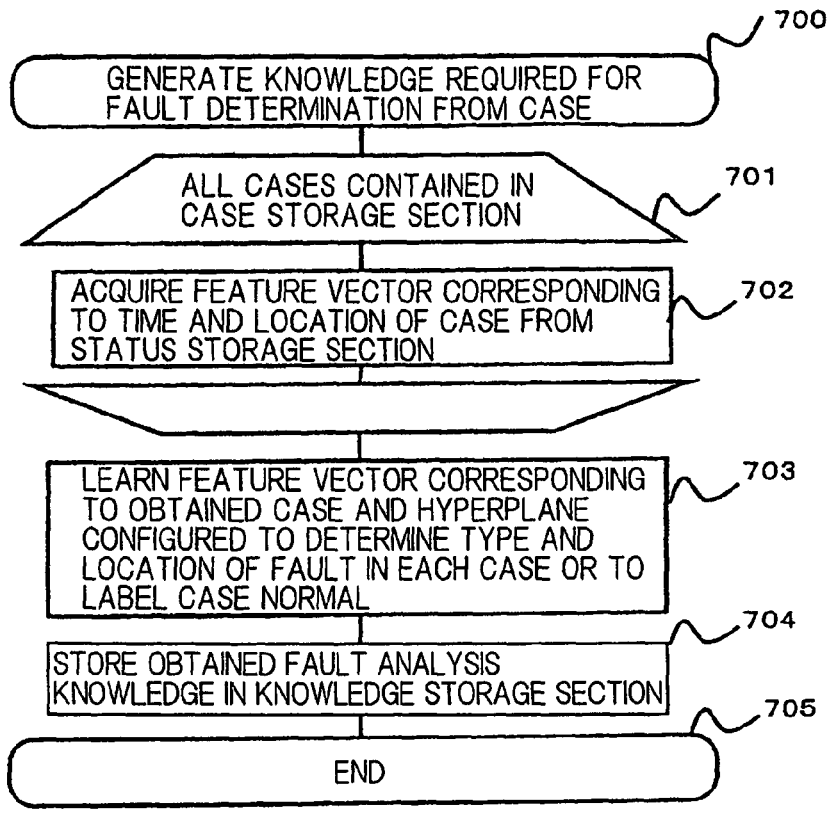
FIG. 10 is a flowchart illustrating the operation of the fault analysis apparatus shown in FIG. 4.

FIGS. 8 to 10 are flowcharts illustrating the operation of fault analysis apparatus 400 shown in FIG. 4.

First, system status acquisition section 401 acquires the system information (including the abnormality level and status information) from monitoring target system 430. System status acquisition section 401 passes the acquired system information to pattern determination section 415 (step 501).

Pattern determination section 415 uses the threshold (hyperplane) contained in knowledge storage section 414 to determine the type of the case in monitoring target system 430 based on the system information received from system status acquisition section 401. Pattern determination section 415 passes the determination result (the type of the case or the type) and the identification information for the system information (case) to determination result display section 416 (step 502).

Then, in step 502, when pattern determination section 415 determines the case to be a fault, determination result display means 416 displays the determined pattern (type) received from pattern determination section 415 and the identification information for the system information (case) to the maintenance operator (step 503).

Then, the maintenance operator inputs the case and the true type, that is, the location and time of occurrence of the case or the time and location determined to be normal, and the type of the case to fault case registration section 411 or to determination correction section 417. Fault case registration section 411 or determination correction section 417 stores the inputted case in case storage section 412 (step 601).

Then, pattern learning section 413 generates, by pattern learning, a threshold required for fault determination (step 602). Alternatively, this step may be carried out in accordance with the maintenance operator's instruction.

To generate a threshold required for fault determination, from the case, pattern learning section 413 acquires, from status storage section 410, system information associated with the time and location included in each of all the cases contained in case storage section 412 (steps 701 and 702).

Pattern learning section 413 uses a feature vector formed of the abnormality level and status information included in the system information associated with each case acquired from case storage section 412 to learn a hyperplane required to determine a pattern corresponding to the type of the case for each piece of the system information (step 703). Pattern learning section 413 thus generates a hyperplane.

Pattern leaning section 413 stores the hyperplane generated by learning, in knowledge storage section 414. Pattern determination section 415 uses the hyperplane stored in knowledge storage section 414 to determine the pattern of each piece of the system information received from system status acquisition section 401 (step 704).

Now, the effects of the exemplary embodiment will be described.

In the exemplary embodiment, the system information including the status information on monitoring target devices 431 to 434 is acquired and included in the feature space in pattern learning section 413. Thus, if the maintenance operator registers the case and the type of the case, fault detection and classification can be more accurately carried out. The reason is as follows. A variable not indicating the abnormality level is included in the feature space. This allows generation of a hyperplane required for classification of the case into a fault or the normal state, which is impossible in the related art, or provides a larger margin for the hyperplane to be generated.

Furthermore, in the exemplary embodiment, even in a system in which the adverse effect of a fault is indicated by a certain abnormality level but in which another type of fault is indicated by the same abnormality level, the detected faults can be distinguished from each other based on fault cases registered by the maintenance operator. The reason is as follows. A variable such as the trial count is also included in the feature space. Thus, such a hyperplane as distinguishes the faults from each other can be generated in the feature space or a larger margin is provided for the hyperplane that can be generated.

Furthermore, in the exemplary embodiment, if fault analysis is carried out on such a system as involves a variation in the number of times that the user utilizes the system and if variables in the feature space which indicate the abnormality level of the system include a call loss rate and a failure rate, fault detection can be accurately carried out even in a time zone in which the system is infrequently utilized. The reason is as follows. The inclusion of the trial count in the feature space allows generation of a hyperplane configured to separate a space with a low trial count and a high failure rate from a space with a high trial count and a low failure rate.

Furthermore, even in a system in which a fundamental fault cannot be found based only on the abnormality level of a single monitoring target device and in which a plurality of monitoring target devices affect each other, the accuracy of fault detection can be improved by fault cases registered by the maintenance operator. The reason is as follows. Values estimated from the configuration status of the monitoring target device are included in the feature space. Thus, a hyperplane can be generated which distinguishes a space in which the relationship established among the monitoring target devices falls apart and the abnormally level of only the above-described monitoring target device increases from a space in which the relationship is maintained and the abnormality levels of the other monitoring target devices also increase. Alternatively, a larger margin can be provided for the hyperplane that can be generated.

EXAMPLES

The operation of above-described fault analysis apparatus 400 will be described below with reference to specific examples.

Figure 11:
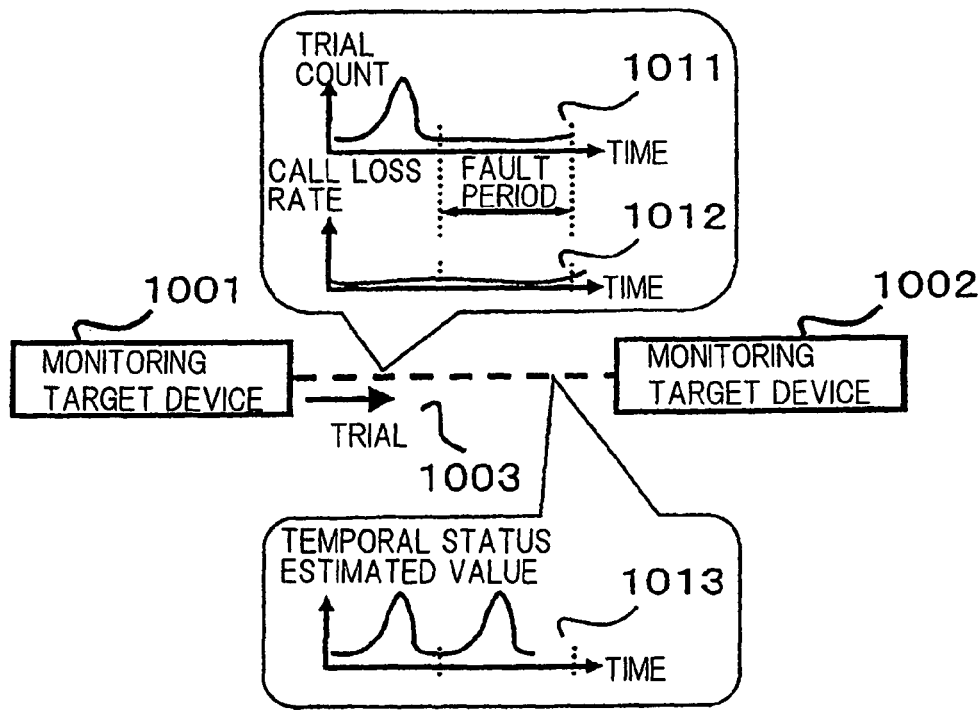
FIG. 11 is a diagram of the configuration of a monitoring target illustrating an exemplary embodiment of operation of the fault analysis apparatus shown in FIG. 4.
Figure 12:
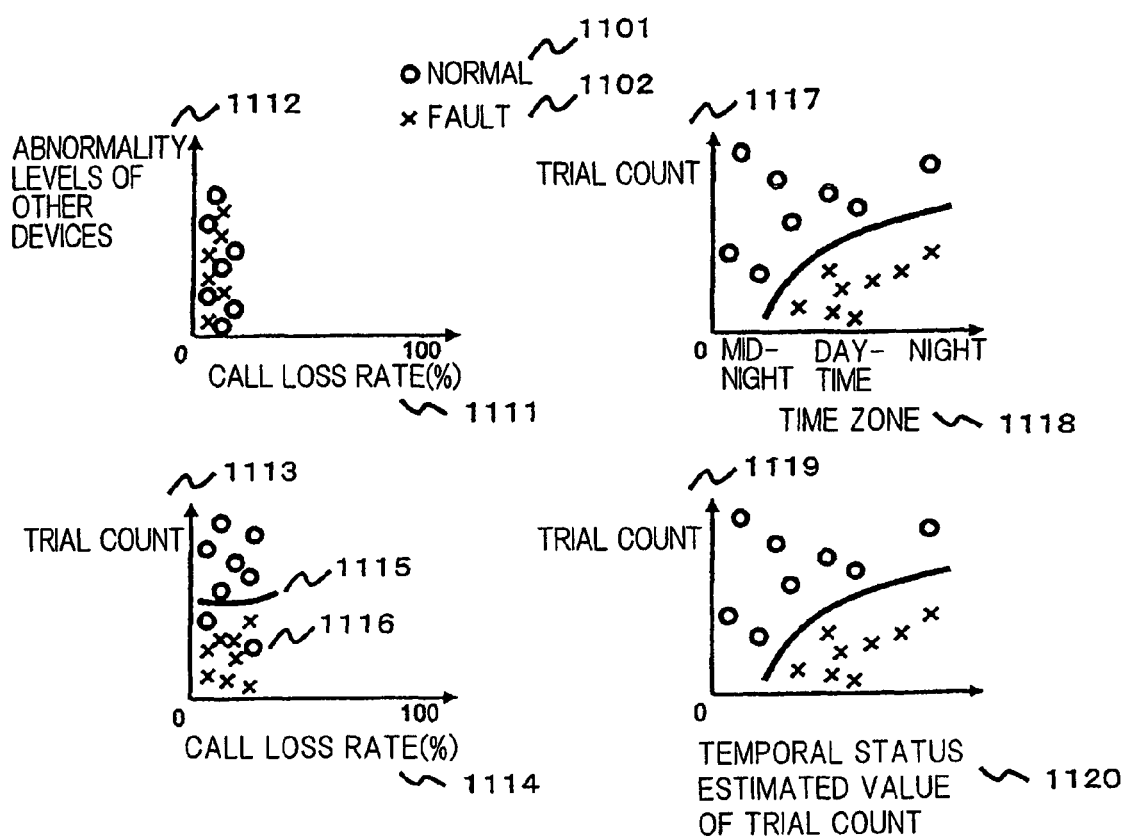
FIG. 12 is a diagram showing a feature space illustrating an exemplary embodiment of operation of the fault analysis apparatus shown in FIG. 4.

FIG. 11 is a diagram of the configuration of a monitoring target illustrating an example of operation of fault analysis apparatus 400 shown in FIG. 4. Furthermore, FIG. 12 is a diagram of a feature space illustrating an example of operation of fault analysis apparatus 400 shown in FIG. 4.

As shown in FIG. 11, in the present example, the following is assumed. Monitoring target device 1001 is present in monitoring target system 430. Monitoring target device 1001 is connected to another monitoring target device 1002. The trial count for connection requests from monitoring target device 1001 per unit time varies as shown by temporal variation 1011. The call loss rate for the trials varies as shown by temporal variation 1012.

In this time sequence data, it is assumed that a fault occurs at a certain time. However, this is not indicated by the call loss rate as shown by temporal variation 1012. Although the trial count decreases, an increase or decrease in trial count does not correspond to a fault.

Here, it is assumed that the maintenance operator uses fault case registration section 411 to register the fault period shown in FIG. 11 as fault cases and the other, normal periods as normal cases. If trial count acquisition section 402 is absent from system status acquisition section 401 and the trial count is not included in the feature space, since in the feature space, normal cases 1101 and fault cases 1102 are distributed in nearby areas as shown in FIG. 12, a hyperplane configured to separate the normal cases from the fault cases is difficult to generate or only an inaccurate boundary surface can be generated.

In contrast, if trial count 1113 is included in the feature space, hyperplane 1115 configured to separate the normal cases from the fault cases can be generated.

However, during a time zone such as midnight when the devices are inherently normal, trial count 1113 decreases and normal cases 1116 may be mixed into the fault cases. This means that during the midnight time zone, a normal case may be detected to be a fault.

Thus, as a feature different from trial count 1117, time zone 1118 can be included in the feature space. This allows generation of a hyperplane configured to accurately separate cases in which the trial count decreases during the midnight time zone from cases in which the trial count decreases during the daytime.

Alternatively, in addition to trial count 1119, temporal status estimated value 1013 (1120) for the trial count may be used.

Then, if the trial count is low when the current trial count is estimated to be high based on the data on the monitoring target for the past normal periods, the monitoring target is determined to be faulty. In contrast, if the trial count is low when the estimated current trial count is low, the monitoring target is determined to be normal.

Figure 13:
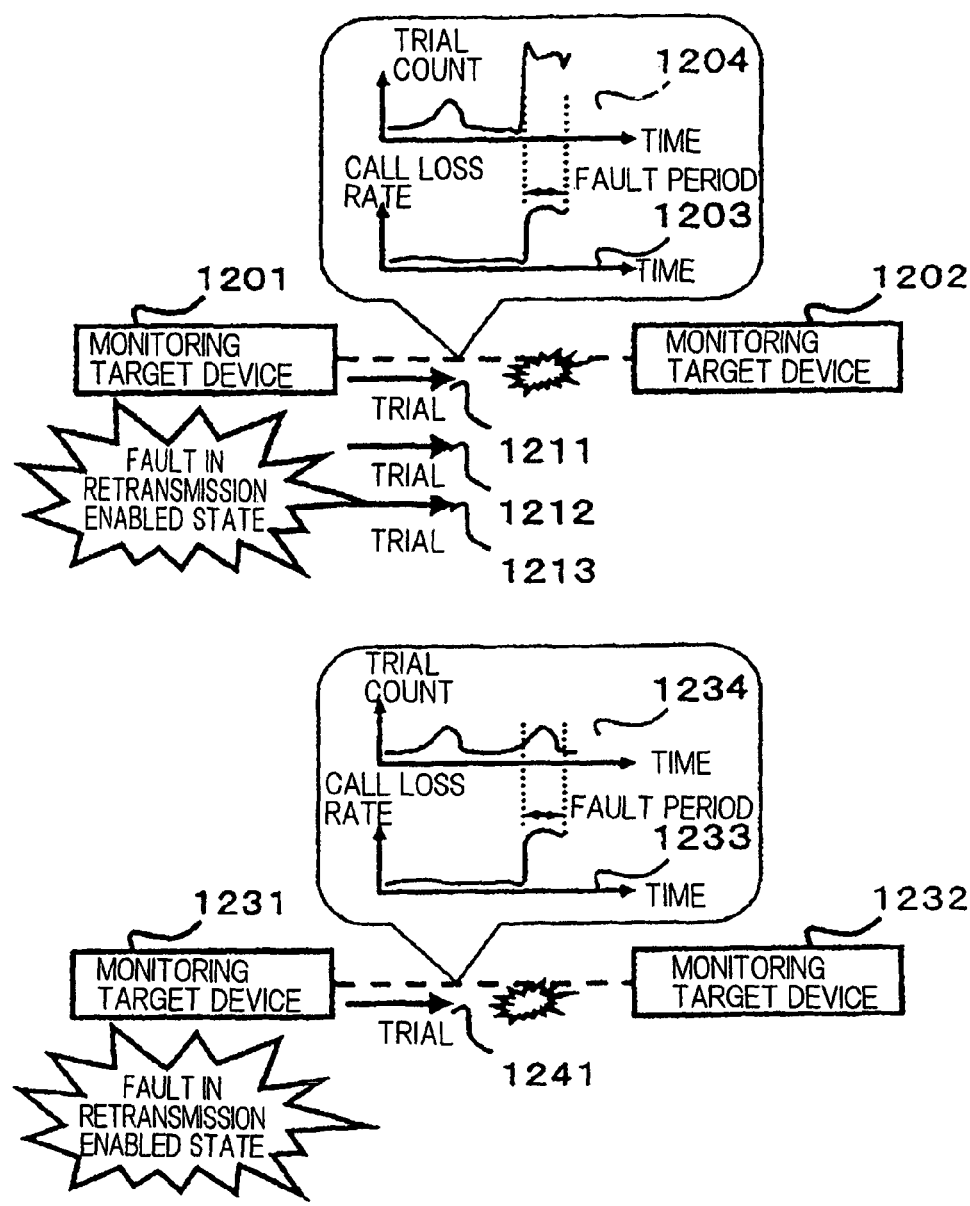
FIG. 13 is a diagram of the configuration of a monitoring target illustrating another exemplary embodiment of operation of the fault analysis apparatus shown in FIG. 4.

FIG. 13 is a diagram of a configuration of a monitoring target illustrating another example of operation of fault analysis apparatus 400 shown in FIG. 4. Furthermore, FIG. 14 is a diagram of a feature space illustrating another example of operation of fault analysis apparatus 400 shown in FIG. 4.

As shown in FIG. 13, in the present example, the following is assumed. Monitoring target device 1201 is present in monitoring target system 430. The following two types of faults may occur in the connection between monitoring target device 1201 and another monitoring target device 1202: a fault occurring when a failed connection request is retransmitted and a fault occurring when a failed connection request is not retransmitted.

For the former fault, the trial is repeated a given number of times as shown by trials 1211 to 1213. Thus, temporal variation 1204 in trial count per unit time increases, and call loss rate 1203 per unit time also increases.

In contrast, for the latter fault, in the connection between monitoring target device 1231 and another monitoring target device 1232, when trial 1241 fails, a retrial is not carried out. Thus, temporal variation 1234 in trial count is not observed, and only call loss rate 1233 is deteriorated.

Here, it is assumed that the maintenance operator uses fault case registration section 411 to register the fault period shown in FIG. 13 as fault cases and the other, normal periods as normal cases. Then, if trial count acquisition section 402 is absent from system status acquisition section 401 and the trial count is not included in the feature space, since in the feature space, cases 1311 with fault pattern 1 and cases 1312 with fault pattern 2 are distributed in nearby areas, as shown in FIG. 4, a hyperplane configured to separate cases 1311 from cases 1312 is difficult to generate or only an inaccurate hyperplane can be generated.

In contrast, if trial count 1322 is included in the feature space, hyperplane 1323 configured to separate cases 1311 with fault pattern 1 from cases 1312 with fault pattern 2 can be generated.

FIG. 15 is a diagram of configuration of a monitoring target illustrating another example of operation of fault analysis apparatus 400 shown in FIG. 4. Furthermore, FIG. 16 is a diagram of a feature space illustrating another example of operation of fault analysis apparatus 400 shown in FIG. 4.

As shown in FIG. 15, in the present example, the following is assumed. Monitoring target device 1401 is present in monitoring target system 430. In connection with the connection between monitoring target device 1401 and another monitoring target device 1402, call loss rate 1404 per unit time is observed with respect to temporal variation 1403 in the trial count per unit time.

Here, it is assumed that the maintenance operator uses case registration section 411 to register fault cases and also registers the period shown in FIG. 15 as normal cases. Then, if trial count acquisition section 402 is absent from the system status acquisition section and if the trial count is not included in the feature space, since in the feature space, such a hyperplane is generated as determines even normal cases 1504 to be a fault as shown in FIG. 16. However, if trial count 1512 is included in the feature space, a hyperplane can be generated which allows a case corresponding to an actual fault to be easily separated from cases 1514 in which at a low trial count, the call drop and the call loss rate increases.

Figure 17:
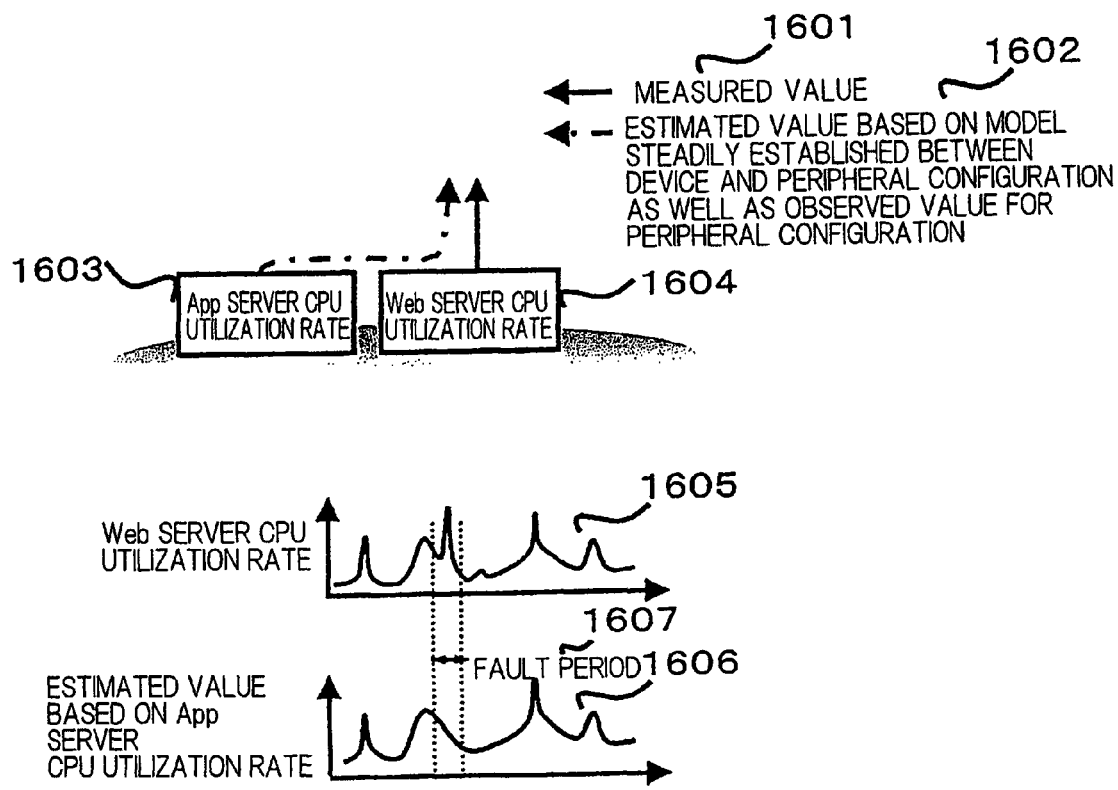
FIG. 17 is a diagram of the configuration of a monitoring target illustrating another exemplary embodiment of operation of the fault analysis apparatus shown in FIG. 4.
Figure 18:
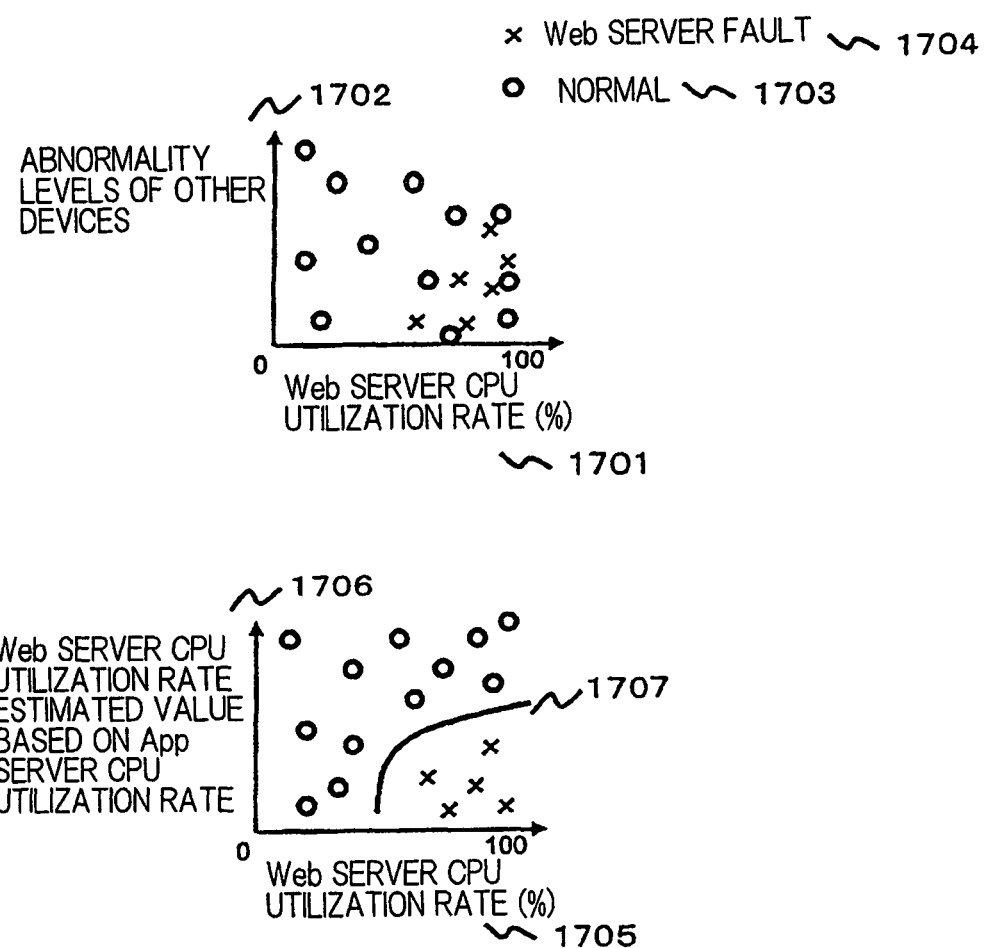
FIG. 18 is a diagram showing a feature space illustrating another exemplary embodiment of operation of the fault analysis apparatus shown in FIG. 4.

FIG. 17 is a diagram of configuration of a monitoring target illustrating another example of operation of fault analysis apparatus 400 shown in FIG. 4. Furthermore, FIG. 18 is a diagram of a feature space illustrating another example of operation of fault analysis apparatus 400 shown in FIG. 4.

As shown in FIG. 17, in the present example, App server 1601 is present in monitoring target system 430 as a monitoring target device. A CPU utilization rate corresponding to the abnormality level of App server 1601 is acquired through monitoring. Furthermore, Web server 1604 is present in monitoring target system 430 as another monitoring target device. The CPU utilization rate corresponding to the abnormality level of Web server 1604 is acquired through monitoring. Thus, time sequence data 1605 is obtained.

Furthermore, a steady mathematical relationship is established between the Web server and the App server. Time sequence data 1606 on the value for the App server is obtained which data is estimated from values obtained from Web server 1604.

Here, it is assumed the maintenance operator uses fault case registration section 411 to register fault period 1607 shown in FIG. 17 as fault cases and data on the other periods as normal cases. Then, if trial count acquisition section 402 is absent from system status acquisition section 401 and the configuration status estimated value is not included in the feature space, such a hyperplane is not generated to separate fault cases 1704 of the device from normal cases 1703 of the device or only a hyperplane with a low classification accuracy can be generated, as shown in FIG. 18. However, if the configuration status estimated value is included in the feature space, a hyperplane can be generated which allows a space indicating that only the abnormality level of only the relevant device is high even though the device is normal to be easily separated from a space indicating that not only this device but also the other relevant devices have an increased abnormality level.

The present invention can be used for applications for operation and management of computer system and/or a network system.

According to the present invention, the processing in the fault analysis apparatus may be executed as follows instead of being implemented by the above mentioned dedicated hardware. A program for implementing the functions of the fault analysis apparatus is recorded in a recording medium from which data can be read by the fault analysis apparatus. The program recorded in the recording medium is loaded into the fault analysis apparatus, which then executes the program. The recording medium from which data can be read by the fault analysis apparatus refers to a relocatable recording medium such as an IC card, a memory cad, a floppy disk (registered trademark), magnetooptical disk, a DVD, or a CD, or an HDD built into the fault analysis apparatus. The program recorded in the recording medium is loaded into, for example, a control block, which controllably executes processing similar to that described above.

The present invention has been described with reference to the examples. However, the present invention is not limited to the above-described examples. Various changes understandable to those skilled in the art may be made to the configuration and details of the present invention without departing from the scope of the present invention.

The present application claims priority based on Japanese Patent Application No. 2008-058441 filed on Mar. 7, 2008 and incorporates the entirety of the disclosure thereof.

The invention claimed is:

1. A fault analysis apparatus, comprising:
   system information reception means for sequentially receiving system information including a plurality of index values indicative of abnormality levels of a monitoring target device and identification information for the system information, from the monitoring target device configured to sequentially output the system information together with the identification information for the system information;
   type determination means for comparing each piece of the system information received by the system information reception means with a predetermined determination criterion to determine the piece of the system information to be of a particular type based on a result of the comparison;
   a determination result output section configured to output the identification information for each piece of the system information and the type determined for each piece of the system information, in association with each other;
   fault case registration means for accepting input information indicative of a true type of the identification information for the each piece of the system information, the true type identifying a type of a fault of a detected case;
   case storage means for storing the identification information for each piece of the system information in association with the true type; and
   pattern learning means for updating the determination criterion based on each piece of the system information received by the system information reception means and the true type stored in association with the identification information for each piece of the system information,
   wherein the system information reception means comprises temporal status estimated value calculation means for calculating current predicted values for index values included in the system information received by the system information reception means, based on the index values, and
   wherein the type determination means includes, in each piece of the system information, the index values including the predicted values calculated by the temporal status estimated value calculating means, and compares resultant system information with the determination criterion to determine each piece of the system information to be of a particular type.

2. A fault analysis apparatus connected to each of a first monitoring target device and a second monitoring target device so as to be capable of communicating with each of the first and second monitoring target devices, the fault analysis apparatus comprising:
   system information reception means for sequentially receiving system information including a plurality of index values indicative of abnormality levels of the first and second monitoring target devices and identification information for the system information, from the first and second monitoring target devices;
   type determination means for comparing each piece of the system information received by the system information reception means with a predetermined determination criterion to determine each piece of the system information to be of a particular type based on a result of the comparison;

a determination result output section configured to output the identification information for each piece of the system information and the type determined for each piece of the system information, in association with each other;

fault case registration means for accepting input information indicative of a true type of the identification information for each piece of the system information, the true type identifying a type of a fault of a detected case;

case storage means for storing the identification information for each piece of the system information in association with the true type for each of the monitoring target devices; and pattern learning means for updating the determination criterion based on each piece of the system information received by the system information reception means and the true type stored in association with the identification information for each piece of the system information, wherein the system information reception means comprises configuration status estimated value calculating means for calculating a relationship between each index value for the first monitoring target device and each index value for the second monitoring target device and determining a predicted value for each index value for the second monitoring target device based on each index value for the first monitoring device and the calculated relationship, and wherein the type determination means includes the predicted value determined by the configuration status estimated value calculating means, in each piece of the system information, and compares resultant system information with the determination criterion to determine each piece of the system information on the second monitoring target device to be of a particular type.

* * * * *